United States Patent

[11] 3,572,817

| [72] | Inventors | Albert J. Colautti<br>Windsor, Ontario, Canada;<br>Angelo Guarrasi, Harper Woods, Mich. |
|---|---|---|
| [21] | Appl. No. | 842,099 |
| [22] | Filed | July 16, 1969 |
| [45] | Patented | Mar. 30, 1971 |
| [73] | Assignee | General Motors Corporation<br>Detroit, Mich. |

[54] ADJUSTER MECHANISM FOR A VEHICLE SWIVEL SEAT
5 Claims, 6 Drawing Figs.

[52] U.S. Cl. .................................................. 296/65,
248/425, 297/349
[51] Int. Cl. ................................................ B60n 1/04
[50] Field of Search .......................................... 296/65,
65(.1), 63; 297/240, 349; 248/425

[56] References Cited
UNITED STATES PATENTS

| 2,939,511 | 6/1960 | Gilson et al. .................. | 248/425 |
| 3,322,458 | 5/1967 | Bachmann ..................... | 296/65 |

*Primary Examiner*—Benjamin Hersh
*Assistant Examiner*—John A. Pekar
*Attorneys*—J. L. Carpenter and E. J. Biskup

ABSTRACT: An adjuster mechanism interposed between a vehicle seat and the vehicle floor portion for supporting the seat for rotational movement about a vertical axis between a first position wherein the seat faces forwardly and a second position wherein the seat faces the vehicle door. The adjuster mechanism includes a disc-shaped member attached to the seat and having means formed thereon which cooperate with a manually operable handle for positively locking the seat in the first position and for detenting the seat in the second position.

INVENTORS
Albert J. Colautti &
Angelo Guarrasi
BY C. J. Biskup
ATTORNEY

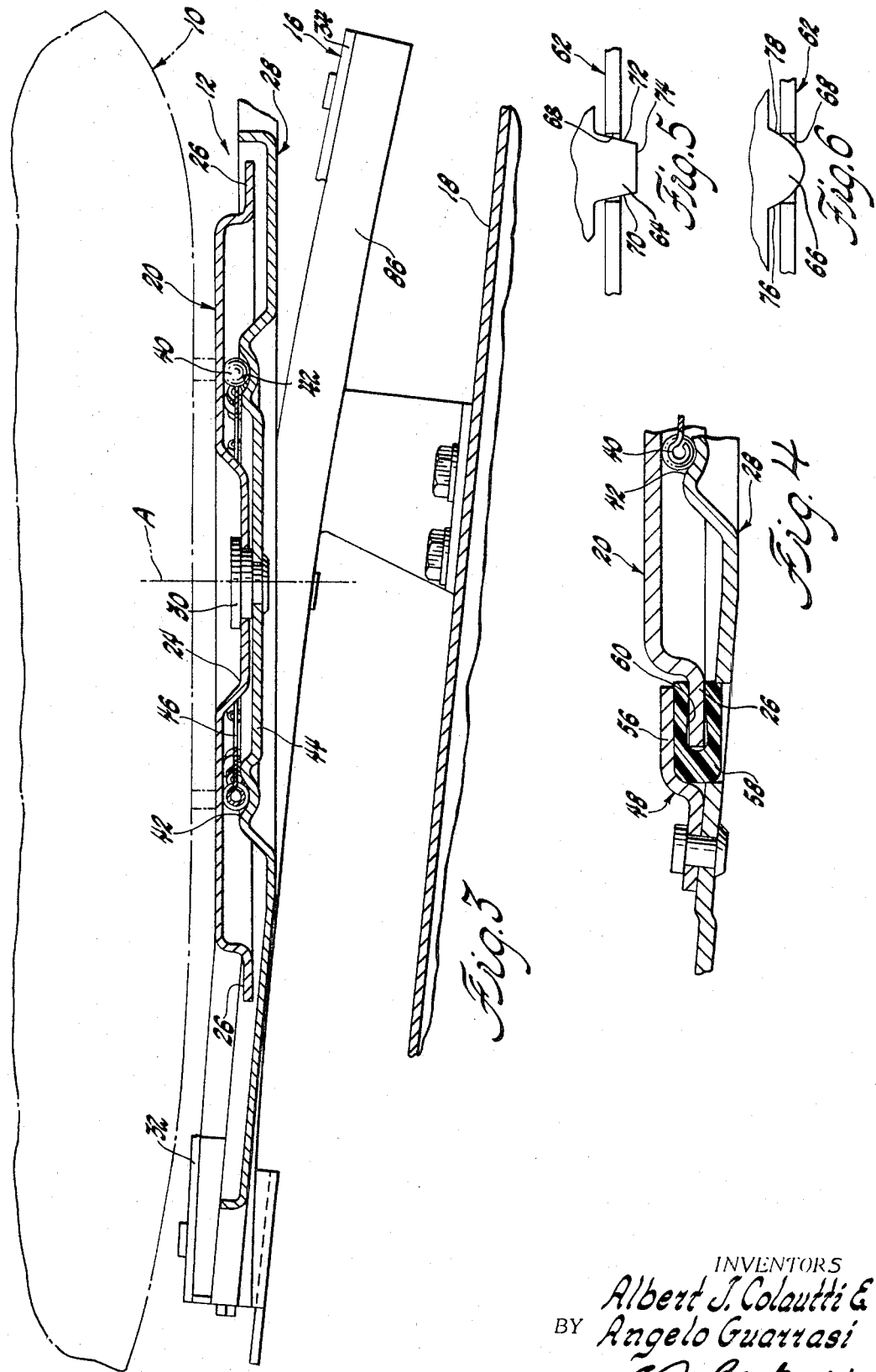

ADJUSTER MECHANISM FOR A VEHICLE SWIVEL SEAT

This invention relates generally to vehicle seats of the swivel type which permit the seat occupant to gain entrance to and exit from the vehicle more readily. More particularly, this invention concerns an adjuster mechanism for this type of seat which in the preferred form comprises a stationary base member secured to the vehicle floor. A disc-shaped member is rigidly attached to the lower end of the seat and is supported at a central point thereof by the base member for rotational movement about a vertical axis. Bearing means in the form of a plurality of ball bearings are positioned between the base member and the disc-shaped member for providing substantially frictionless rotational movement of the seat relative to the base member. The seat is stabilized in the fore-and-aft direction as well as laterally by circumferentially spaced guide shoes which are mounted on the base member and accommodate the peripheral edge of the disc-shaped member. A latching arrangement including a manually operable handle cooperates with a pair of projections formed on the disc-shaped member for locking the seat in a first position wherein the seat faces forwardly and for detenting the seat in a second position wherein the seat faces the vehicle door. The latching arrangement is such that when the vehicle seat is in the forwardly facing position, the seat cannot be rotated relative to the vehicle floor without first actuating the handle. On the other hand, when the vehicle seat is in the second position facing the vehicle door, the seat can be returned to the forwardly facing position by the bodily movement of the seat occupant and without requiring manual movement of the handle.

The objects of the present invention are to provide a vehicle seat supported for movement about a vertical axis and movable between two fixed positions, one of which permits the seat occupant to be aligned with the longitudinal axis of the vehicle and the other to face the side of the vehicle; to provide a seat adjuster mechanism for a vehicle seat of the swivel type that serves to positively lock the seat in a forwardly facing position and releasably detents the seat in a side facing position; to provide a seat adjuster mechanism for a pivoted seat which includes a latch device having a manually operable handle which cooperates with a rigid portion of the seat support for locking the seat in one position and detenting the seat in a second position; to provide a vehicle seat that is supported for indexing movement about a vertical axis by a base member which in turn is carried by a track assembly which provides for fore-and-aft adjustment of the vehicle seat; to provide a vehicle seat of the swivel type which is rigidly supported by a disc-shaped member, the peripheral edge of which is accommodated by a plurality of circumferentially spaced guide members for supporting the seat from movement relative to the base member about mutually perpendicular axes lying in a substantially horizontal plane.

The above objects and others of the present invention will be more apparent from the following detailed description when taken with the accompanying drawings wherein:

FIG. 3 is an enlarged cross-sectional view taken on line 3—3 of FIG. 2;

FIG. 4 is an enlarged cross-sectional view taken on line 4—4 of FIG. 2;

FIG. 5 is a fragmentary view showing the engagement of one of the projections formed with the seat support and the handle portion of the latch device incorporated with this invention; and FIG. 6 is similar to FIG. 5 but shows the engagement between the handle portion and the other of the projections formed with the seat support.

Figure 1:
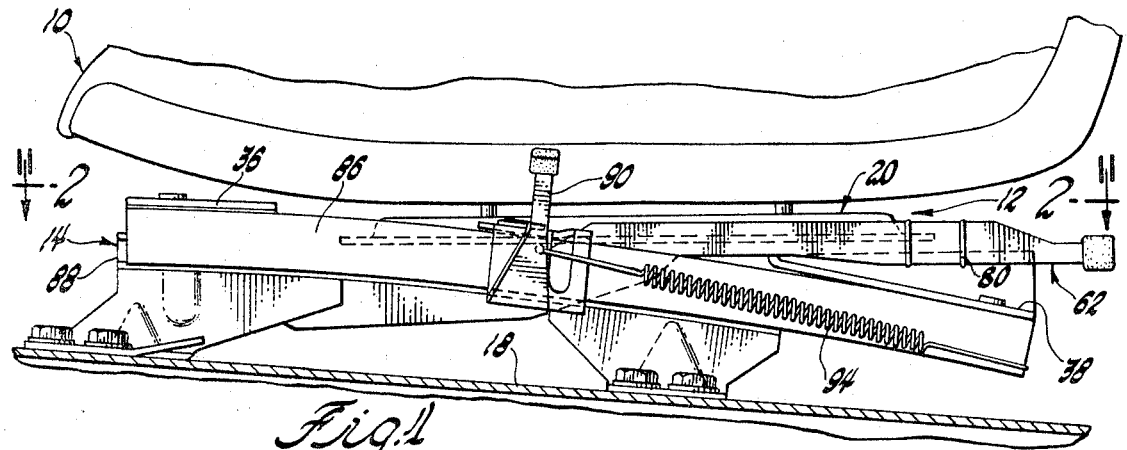
FIG. 1 is a side elevational view showing an adjuster mechanism made according to the invention supporting a vehicle seat.
Figure 2:
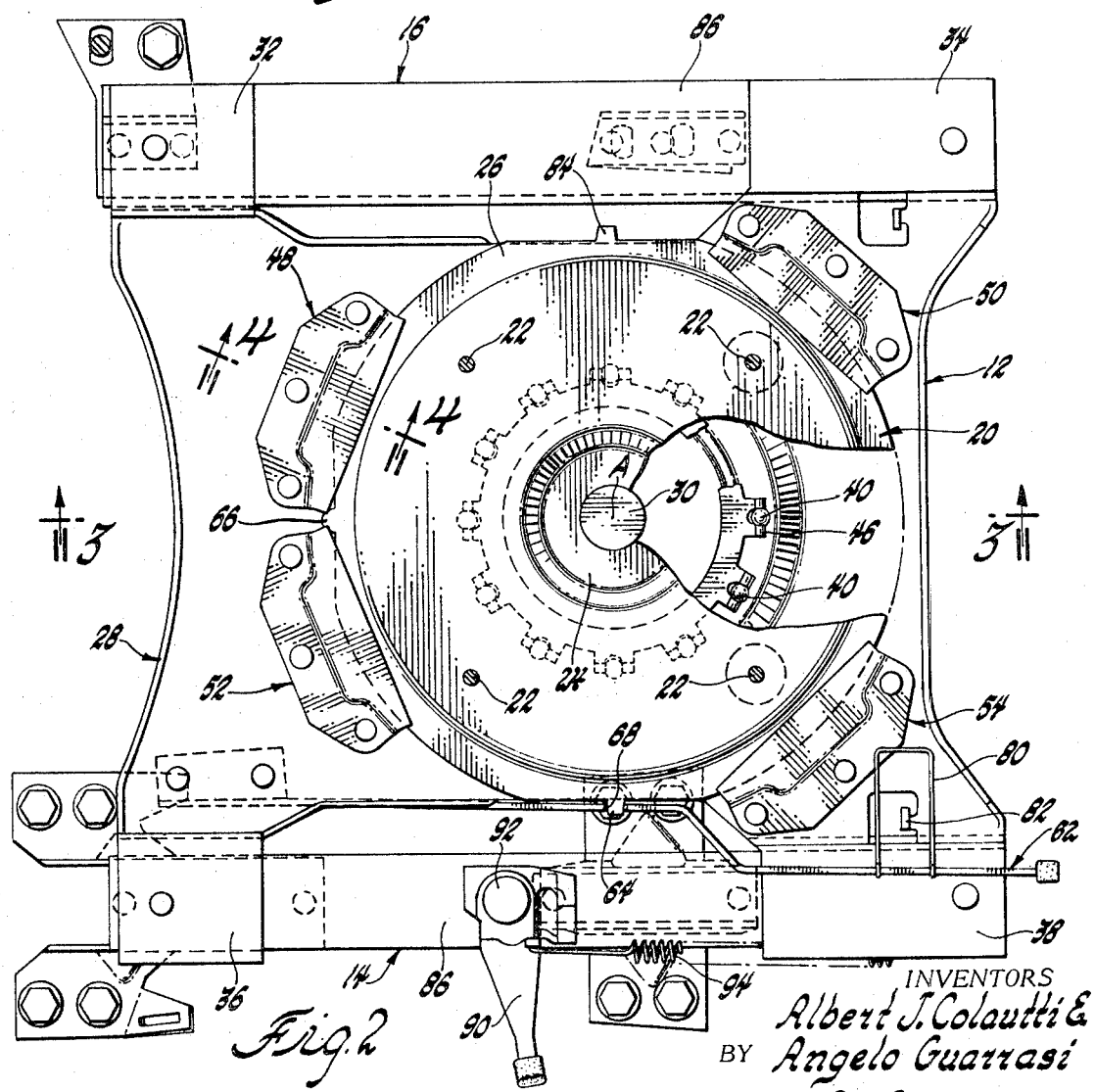
FIG. 2 is an elevational view of the seat adjuster mechanism of FIG. 1 and taken on line 2—2 of FIG. 1.

Referring to the drawings and more particularly FIGS. 1 and 2 thereof, a vehicle seat 10 of the bucket type is shown with its lower end or bottom supported on a swivel-type seat adjuster mechanism made according to the invention and generally indicated by the numeral 12. The seat adjuster mechanism 12 in turn is carried by a pair of laterally spaced track assemblies 14 and 16 each of which extends longitudinally of the vehicle and is rigidly secured to a vehicle floor 18. Thus, as will become apparent as the description of the invention proceeds, the seat adjuster mechanism 12 provides for pivoting or rotational movement of the vehicle seat 10 about a substantially vertical axis while the track assemblies 14 and 16 provide for fore-and-aft adjustable movement of the vehicle seat 10 relative to the floor 18. Moreover, although not shown, the vehicle seat 10 is positioned adjacent to a vehicle door which, as viewed in FIG. 2, would be located at the lower end of the drawing sheet. Thus, it will be understood that as seen in FIGS. 1 and 2, the vehicle seat 10 is facing the front end of the vehicle and when it is desired to move the seat towards the door, the seat is rotated in a counterclockwise direction.

The seat adjuster mechanism 12, which provides for the above-described rotational movement of the vehicle seat 10, includes a disc-shaped seat support member 20 which is rigidly attached to the underside of the vehicle seat 10 by a plurality of angularly spaced bolts, the shank portion of each of which is identified by the reference numeral 22 as seen in FIG. 2. The central portion of the support member 20 is formed with a depressed well 24 as seen in FIG. 3, while the peripheral edge has a radially extending rim 26 which is vertically offset from the main body of the seat support member 20.

The seat support member 20 has the center thereof rotatably secured to a base member 28 by a pivot pin 30 so as to provide for pivotal or rotational movement of the vehicle seat 10 about a vertical axis A as seen in FIG. 3. The base member 28 is a sheet metal stamping having a body portion which is generally rectangular in configuration as viewed in FIG. 2 and includes four laterally outwardly extending and integral legs 32, 34, 36, and 38. Legs 36 and 38 are rigidly secured to the upper portion of track assembly 14, while legs 32 and 34 are secured to the top part of track assembly 16. In order to provide for substantially frictionless rotation of the seat support member 20 relative to the base member 28, a plurality of circumferentially spaced ball bearings 40 are located within an annular groove 42 formed in a raised portion 44 of the base member 28 with the center of the groove 42 being located along the axis A. The ball bearings 40 are supported by an annular cage 46 which serves to angularly space the ball bearings and assure uniform rotational movement thereof during operation of the seat adjuster mechanism 12.

As best seen in FIGS. 2 and 4, the rim 26 of the seat support member 20 is supported at angularly spaced points by four guide members 48, 50, 52, and 54, each of which comprises an outer housing 56 defining a pocket which fixedly accommodates a plastic shoe 58. The shoe 58 is generally U-shaped in cross section having a horizontal slot 60 formed therein which receives a portion of the rim 26 and frictionally engages the upper and lower surface thereof. The guide members 48, 50, 52, and 54 are grouped in pairs forwardly and rearwardly of a transverse plane passing through the axis A so as to preclude pivoting of the vehicle seat 10 about a longitudinally extending horizontal axis and a transverse horizontal axis passing through the axis A. Thus, the guide members 48, 50, 52, and 54 together with the pivot pin 30 serve to stabilize the seat so as to prevent any undesirable movement about the aforementioned mutually perpendicular axes.

As described above, it should be apparent that the vehicle seat 10 is supported by the seat support member 20 for rotational movement about the vertical axis A. One feature of this invention is that the seat 10 can be locked in a forwardly facing position such as seen in FIGS. 1 and 2 and also can be detented into a side facing position wherein the seat occupant faces the vehicle door. This feature is realized by the use of a latch device which includes a manually operable handle 62 and a pair of radially extending and angularly spaced projections 64 and 66 formed on the peripheral edge of the rim 26 of the seat support member 20. As seen in FIGS. 1 and 2, the handle 62 is formed as an elongated bar, the forward end of which is rigidly attached to the leg 36 of the base member 28. The bar portion of the handle 62 is made from spring steel and is secured to the base member in a manner so as to cause it to be continuously biased towards the peripheral edge of the seat support member 20. In addition, it will be noted that a notch 68 is located in the intermediate portion of the handle 62 and cooperates with the projections 64 and 66 formed on the support member 20 for selectively locking the vehicle seat 10 in the forwardly facing position and detenting the seat in the side facing position. In this regard, it will be noted that as seen in FIG. 5 the projection 64 is formed with a pair of sidewalls 70 and 72 which lie in substantially parallel planes. An end wall 74 connects the sidewalls 70 and 72 and lies in a plane which is tangent to the peripheral edge of the seat support member. Thus, when the projection 64 is located within the notch 68 formed in the handle 72, the vehicle seat 10 is positively locked in the forwardly facing position. On the other hand, the projection 66 is formed in a generally V-shape having arcuate sidewalls 76 and 78 which generally lie in planes that intersect closely adjacent to the outboard side of the handle 72. When the projection 66 is located within the notch 68, the vehicle seat 10 is in the side facing position with the seat occupant facing the vehicle door. During such time, the seat 10 is held in a fixed position due to the detent-type engagement between the projection 66 and the notch 68. If, however, the seat occupant wishes to return the seat 10 from the side facing position to the forwardly facing position, there is no need to actuate the handle 62 to realize this objective but merely to apply a bodily imposed clockwise-directed rotating force on the seat 10 which permits the projection 66 to be cammed out of the notch 68. As the seat rotates towards the forwardly facing position, the projection 64 will then move once again into the notch 68 and be locked therein. In other words, if the seat occupant should again wish to move the seat 10 to the side facing position, this can only be accomplished by actuating the handle 62 which amounts to moving the latter laterally away from the seat support member 20 so as to release the projection 64. Outward movement of the handle 62 is limited by a cooperating stop arrangement which consists of a U-shaped wire 80 attached to the handle 62 and an upstanding tab 82 formed rigidly with the base member 28.

Although not required for realizing the above-described advantages of this invention, a third projection 84, which is identical in shape and form to projection 64, is formed on the rim 26 of the support member 20 at a point diametrically opposite to the projection 64. The third projection 84 permits the seat 10 to be rotated in either a clockwise or counterclockwise direction and be locked in position with the vehicle seat 10 facing rearwardly. This added feature would, of course, be of minimal use in connection with the driver's seat, however, it could provide certain advantages for the passenger seat.

One further feature of this invention is the mounting of the seat adjuster mechanism 12 on the track assemblies 14 and 16. Each of the track assemblies 14 and 16 are conventional in design and accordingly details thereof are not shown, but it should be mentioned that each track assembly comprises an upper channel member 86 that is slidably mounted on a lower channel member 88 with a plurality of ball bearings and roller bearings interposed therebetween. In addition, the track assembly 14 differs from the track assembly 16 only in that it incorporates a manually operated lever 90 which when pivoted in a clockwise direction about a support pin 92 as seen in FIG. 2, releases the upper channel member 86 from the lower channel member 88 and allows fore or aft movement of the seat 10. The usual spring 94 is connected between the actuator and the track assembly for returning the actuator to the normal locked position when released by the seat occupant.

We claim:

1. In combination with a vehicle having a door located along one side thereof and a floor portion adapted to support a seat adjacent said door, an adjuster mechanism interposed between the seat and the floor portion for supporting said seat for rotational movement about a vertical axis between a first position wherein the seat faces forwardly and a second position wherein the seat faces the door, said adjuster mechanism comprising a base member secured to the floor portion, a disc-shaped member attached to the lower end of the seat and supported by the base member for rotational movement about said vertical axis, bearing means between said base member and said disc-shaped member for providing substantially frictionless rotational movement of the disc-shaped member relative to the base member, a manually operable handle carried by the base member and having a portion thereof biased toward the disc-shaped member, and means formed on the disc-shaped member at circumferentially spaced points and cooperating with said manually operable handle for positively locking said seat in the first position whereby the seat cannot be rotated relative to the floor portion unless said portion of the handle biased toward the disc-shaped member is moved away from the latter and for detenting the seat when in the second position so that the seat can be returned to the first position without requiring manual movement of the handle.

2. In combination with a vehicle having a door located along one side thereof and a floor portion adapted to support a seat adjacent said door, an adjuster mechanism interposed between the seat and the floor portion for supporting said seat for rotational movement about a vertical axis between a first position wherein the seat faces forwardly and a second position wherein the seat faces the door, said adjuster mechanism comprising a base member secured to the floor portion, a disc-shaped member attached to the lower end of the seat and supported by the base member for rotational movement about said vertical axis, a plurality of circumferentially spaced ball bearings between said base member and said disc-shaped member providing substantially frictionless rotational movement of the disc-shaped member relative to the base member, guide shoes mounted on the base member and accommodating the peripheral edge of the disc-shaped member, a manually operable handle carried by the base member and having a portion thereof biased toward the disc-shaped member, and radially outwardly projecting means formed on the disc-shaped member at circumferentially spaced points and cooperating with said manually operable handle for locking said seat in the first position whereby the seat cannot be rotated relative to the floor portion unless said portion of the handle biased toward the disc-shaped member is moved away from the latter and for detenting the seat when in the second position so that the seat can be returned to the first position without requiring manual movement of the handle.

3. In combination with a vehicle having a door located along one side thereof and a floor portion adapted to support a seat adjacent said door, an adjuster mechanism interposed between the seat and the floor portion for supporting said seat for rotational movement about a vertical axis between a first position wherein the seat faces forwardly, a second position wherein the seat faces the door, and a third position wherein the seat faces rearwardly, said adjuster mechanism comprising a base member secured to the floor portion, a disc-shaped member attached to the lower end of the seat and supported by the base member for rotational movement about said vertical axis in a substantially horizontal plane, bearing means between said base member and said disc-shaped member providing substantially frictionless rotational movement of the disc-shaped member relative to the base member, a manually operable handle carried by the adjuster mechanism and having a portion thereof biased toward the disc-shaped member, and means formed on the disc-shaped member at circumferentially spaced points and cooperating with said manually operable handle for locking said seat in the first and third positions whereby the seat cannot be rotated relative to the floor portion unless said portion of the handle biased toward the disc-shaped member is moved away from the latter and for detenting the seat when in the second position so that the seat can be returned to the first position without requiring manual movement of the handle.

4. In combination with a vehicle having a door located along one side thereof and a floor portion adapted to support a seat adjacent said door, an adjuster mechanism interposed between the seat and the floor portion for supporting said seat for rotational movement about a vertical axis between a first position wherein the seat faces forwardly and a second position wherein the seat faces the door, said adjuster mechanism comprising a base member secured to the floor portion, a disc-shaped member attached to the lower end of the seat and supported at the central point thereof by the base member for rotational movement about said vertical axis in a substantially horizontal plane, bearing means between said base member and said disc-shaped member for providing substantially frictionless rotational movement of the disc-shaped member relative to the base member, guide shoes mounted on the base member and accommodating the peripheral edge of the disc-shaped member, a manually operable handle carried by the base member for movement in a substantially horizontal plane and having a portion thereof formed with a notch and biased toward the disc-shaped member, and a pair of projections formed on the disc-shaped member at circumferentially spaced points and cooperating with said notch in the manually operable handle for locking said seat in the first position whereby the seat cannot be rotated relative to the floor portion unless said portion of the handle biased toward the disc-shaped member is moved away from the latter and for detenting the seat when in the second position so that the seat can be returned to the first position without requiring manual movement of the handle.

5. The combination of claim 4 wherein one of said projections is formed with substantially parallel sidewalls connected by an end wall which lies in a plane tangent to said disc-shaped member while the other of said projections is generally V-shaped.